United States Patent [19]
Coon, Jr. et al.

[11] 3,805,284
[45] Apr. 16, 1974

[54] DIGITAL DATA COPY DUPLICATION METHOD AND APPARATUS UTILIZING BIT TO BIT DATA VERIFICATION

[75] Inventors: Lewis Buel Coon, Jr., Thousand Oaks; Hermann Walter Stocker, Ventura, both of Calif.

[73] Assignee: Burroughs Corporation, Detroit, Mich.

[22] Filed: Sept. 18, 1972

[21] Appl. No.: 289,779

[52] U.S. Cl. .................................... 360/15, 360/53
[51] Int. Cl. ........................ G11b 5/86, G11b 27/36
[58] Field of Search .................. 340/172.5, 174.1 B; 179/100.2 E

[56] References Cited

UNITED STATES PATENTS

| | | | |
|---|---|---|---|
| 3,535,467 | 10/1970 | Thieme et al. | 179/100.2 E |
| 3,359,548 | 12/1967 | Yoshii et al. | 340/174.1 B |
| 3,510,857 | 5/1970 | Kennedy et al. | 340/174.1 B |
| 2,774,056 | 12/1956 | Stafford et al. | 179/100.2 E |
| 2,622,155 | 12/1952 | Dutton | 179/100.2 E |
| 3,653,011 | 3/1972 | Donohue et al. | 340/174.1 B |
| 3,551,608 | 12/1970 | Balint | 179/100.2 E |
| 3,261,003 | 7/1966 | Cogar et al. | 340/172.5 |
| 3,012,230 | 12/1961 | Galas et al. | 340/172.5 |
| 3,268,870 | 8/1966 | Chalker, Jr. et al. | 340/172.5 |
| 2,688,656 | 9/1954 | Wright et al. | 340/172.5 |
| 3,345,614 | 10/1967 | Neel | 340/172.5 |

*Primary Examiner*—Gareth D. Shaw
*Attorney, Agent, or Firm*—Albin H. Gess; B. F. Spencer; Edward G. Fiorito

[57] ABSTRACT

Master quality copies of digital data are generated by a method and apparatus that provides bit to bit data verification for each track of data on the produced copies. The integrity of the data on the copies being generated is verified by comparing, on a continuous flow basis, data written on the copies with the same data read from the copies. A data storage device stores the data written on the copies and provides it for comparison with data read from them. The data stored in the storage device is verified before being read out. Detection and indication that the number of clock bits written on the respective copies equals the number of clock bits read from them is provided as further verification of the copies.

6 Claims, 3 Drawing Figures

DIGITAL DATA COPY DUPLICATION METHOD AND APPARATUS UTILIZING BIT TO BIT DATA VERIFICATION

BACKGROUND OF THE INVENTION

The present invention relates generally to improvements in digital data copy duplication methods and apparatus and more particularly pertains to a new and improved method and apparatus for verifying the digital data reproduced on the copy.

In the field of magnetic medium data recording wherein it has been desirable and necessary to verify the information being recorded, several methods heretofore have been used to provide some indication of the veracity of the information on the copy. One technique, for example, involves monitoring of the current in the recording head during the recording operation. An indication that current is present in the head is taken as an indication that the information is being correctly recorded on the medium. This technique can provide an erroneous verification of data on a copy because the recording head may become clogged with oxide, causing a current in the head indication even when no information is being impressed on the medium. Another technique utilizes a reproduce head, located downstream from the recording head, in the reproducing equipment to interrogate the information that had previously been written. This technique, however, in addition to requiring an additional recording head, requires large storage capacity for comparing the recorded and read data on a steady state basis. Because of its inherent operation, this technique is slow. The data that is recovered from the copy by the downstream head is compared with the data that had been previously recorded, after a large block of information had been recorded on the copy and stored in the storage means, before the next block of information is written on the copy. Another technique involves using only one read/write head. U.S. Pat. No. 3,571,582, for example, uses the same read/write head for recording data on a magnetic medium as reading data therefrom to verify its accuracy. This system, however, requires additional transducers to locate frame addresses and requires a complicated control procedure and expensive hardware, to implement it, in addition to having to stop recording on the copy while reading from it.

In order to eliminate the requirement of a large storage capacity, in a situation when data is being read from one source and written onto another source at varying rates, it has been recognized, such as in U.S. Pat. No. 3,571,801, that a relatively small storage register may be used as a buffer between the data source and the data read out unit. By feeding data into the storage register at a rate that does not substantially exceed or fall below the rate at which data is read out of the register, there is a dynamic flow of data from the supply source to the read-out source with the storage register acting as a buffer for slight variations in the data in-rate versus the data out-rate.

SUMMARY OF THE INVENTION

It is, therefore, an object of this invention to provide a fast digital data record duplication system that generates a plurality of master quality slave copies from one master record.

It is a further object of this invention to provide a digital data record duplication system that provides fast bit to bit data verification for each track of digital data duplicated on the slave copies.

These objects and the general purpose of this invention are accomplished by a method and apparatus that can produce a plurality of slave copies simultaneously and provides bit to bit data verification, on a continuous flow basis, for each track of data on the slave copies. Data is read from a master record and written on a slave copy or plurality of slave copies simultaneously, on a continuous flow basis, while data is being read from the master record. Each track of slave copy data is verified by reading the previously written data and comparing it with such data, on a continuous flow basis, while data is being written on the slave copy.

DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof, and wherein.

DESCRIPTION OF THE PREFERRED EMBODIMENT

Figure 1:
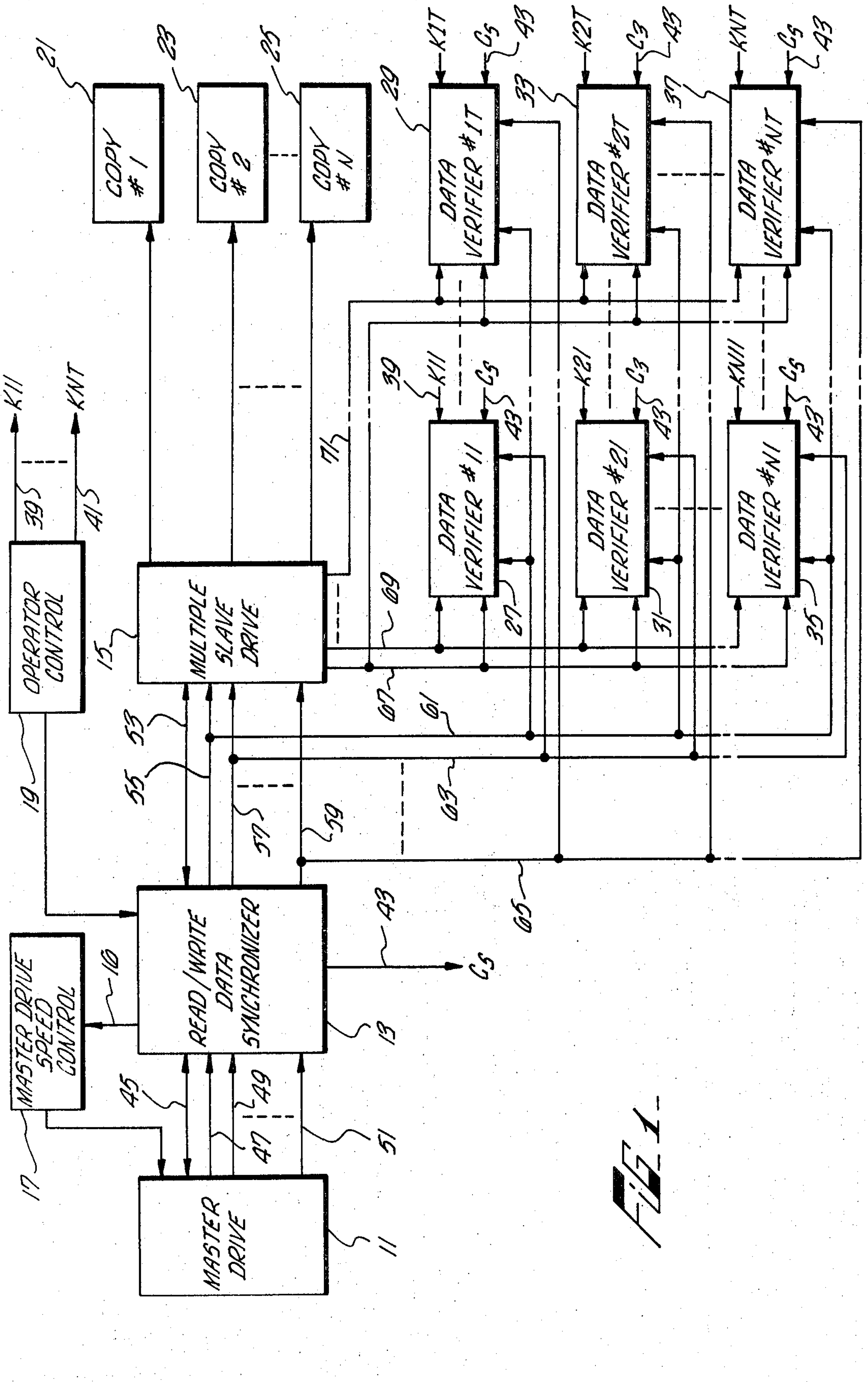
FIG. 1 is a block diagram representation of a multi-track multi-copy digital data duplication system employing data verification.

Referring first to FIG. 1 wherein a multiple-track, multiple-copy digital data duplication system is shown consisting of a master drive 11 for obtaining information from a master copy that is to be supplied to a slave drive 15 through a read/write data synchronizer 13, the slave drive producing a plurality of copies 21, 23 and 25 of the master. Data verifier circuitry 27, 29, 31, 33, 35 and 37 is assigned to each track of data recorded on the plurality of copies, 1 to N.

Master drive 11 may be any well known information readout device, such as a tape transport with read electronics, for example, a magnetic disk drive with its associate read electronics, or even a core memory with its associated retrieval electronics. For the sake of convenience and simplicity it will be assumed that master drive 11 is a tape transport with associated read electronics. The output of master drive 11, therefore, is a series of clock signals over clock line 47 and a plurality of digital data strings, over data lines 49 to 51, one for each track of data recorded on the magnetic medium utilized by the master drive. A magnetic medium motion control line 45 carries signals from operator control circuitry 19 to cause the magnetic medium in master drive 11 to rotate in one direction or another; i.e., in the read direction or in the rewind direction. Master drive unit 11 has been described as being a tape drive transport that utilizes a plurality of data tracks. It should be understood, however, that cassette drives that utilize only a single data track along with a clock track may also be used as a master drive.

The read/write data synchronizer 13 comprises a data storage device such as a register or random access memory that receives the data and clock information from the master drive 11. If only a single storage device is utilized for a master drive that has a plurality of data tracks, the read/write data synchronizer requires a parallel/serial conversion device, which is well known in the art, since the read/write data synchronizer will only work in a serial mode. However, the read/write data synchronizer may receive date in a parallel form if a data storage device is provided for each data track being supplied by the master drive 11. The data beingg supplied by master drive 11 is read into the storage device or devices in the read/write data synchronizer 13 at a rate dictated by the clock pulses being supplied to the data synchronizer over clock line 47. These clock pulses originate in the master drive; in our example, from the magnetic medium. The data in a storage device of the read/write data synchronizer 13 is read out of the storage device at a clock rate supplied by a standard three phase clock generating device which supplies a three phase clock rate. This type of clock generator is well known in the art. One phase from the three phase clock is supplied over clock line 55 to the multiple slave drive 15 and dictates the rate at which data is removed from a storage device in the data synchronizer 13 and read onto the plurality of copies 21, 23, and 25 generated by the multiple slave drive 15. The other two clock phases of the three phase clock are supplied over line 43 to control the various sequences of operation in the data verifiers and the read/write synchronizer.

Multiple slave drive 15 is similar to master drive 11 except that it is in a write mode rather than a read mode and may use a common drive to move the plurality of magnetic mediums, each of which makes up a copy, or, control the individual drives, one for each medium that makes a copy. In other words, the multiple tracks of data, such as data track number 1 received on line 57 and data track number T received on line 59, as well as clock information on line 55 received by the slave drive 15 are simultaneously written on each of the copies 21, 23, and 25 that are being generated by the multiple slave drive 15. A motion control line 53, here again, conducts signals from operator control circuits 19 to cause the multiple slave drive to rotate in the write direction or rewind direction.

The data storage device or devices in the read/write data synchronizer 13 conceptually operates very similarly to the storage register in prior art U.S. Pat. No. 3,571,801. In other words, a master drive speed control 17 is responsive to signals received from the read/write data synchronizer 13 over line 16 to regulate the speed of the motor driving the magnetic medium in the master drive 11 so that the data ratc over data lines 49 to 51 into the storage device in read/write data synchronizer 13 does not greatly exceed the data read-out rate over lines 57 to 59 of the data storage device in read/write data synchronizer 13. This prevents the data storage device from overflowing. The converse will also be true. In other words, the speed of the motor driving the magnetic medium in the master drive 11 will beincreased if the data rate over lines 49 to 51 into the data storage device within read/write data synchronizer 13 is greatly less than the data read-out rate, over data lines 57 to 59, out of a data storage device in read/write data synchronizer 13. Thus, in effect, the data storage device in the read/write data synchronizer will neither overflow or be exhausted. The amount of data within the data storage device may vary from instant to instant, depending on the minor data rate fluctuations between the data input rate and the data output rate.

The master drive speed control circuitry 17 may be a standard servo motor control circuit and does not constitute any part of this invention.

The logic circuitry of the operator controls 19 is well within the purview of a person of ordinary skill in the art. For example, the operator control logic circuits 19 supply start, stop and rewind control pulses to the read/write data synchronizer 13 and to the data verifiers 27 through 37. Control line 39, for example, supplies a signal $K_{11}$ to number 11 data verifier 27 while control line 41 supplies a control signal $K_{NT}$ to number NT data verifier 37. The exact number of data verifiers 27 through 37, of course, depends upon the number of simultaneous copies, 21 through 25, that are being generated and the number of tracks of data, 1 through T, that are used per copy. In other words, a ratio of one data verifier per each track of digital data to be verified is desirable. Although, a single data verifier may be used if a parallel/serial conversion is performed.

Each data verifier, taking number 11 data verifier 27 for example, receives one track of digital data and the clock information that is being written onto its copy, number 1 copy 21, and receives data and clock information that has been read from that copy by a read gap downstream from the write gap on the magnetic head assigned to that track of information in the multiple slave drive 15.

The data track that has been read from a copy is compared, bit by bit, with the data that has been recorded on that copy to verify the data recorded on that copy. This is cone on a continuous flow basis as will be hereinafter explained. Taking the number 11 data verifier 27 as an example, the data to be recorded on track one of number 1 copy 21 is the data entering multiple slave drive unit 15 over data line 57 and is supplied to the number 11 data verifier 27 over line 63. Clock information over clock line 55 is supplied to each data verifier and copy. The data information that is being written onto copy number 1 in track 1, at the same time, is being supplied to the number 11 data verifier 27. When the read gap of the head in multiple slave drive unit 15 transgresses data information, it will output the clock information that it has read to the number 11, 27 data verifier over clock line 67 and output the data over data line 60.

The other data verifiers 29, 31, 33, 35 and 37 receive the same type of information. For example, the number 1T data verifier 29 receives the T track of data from copy number 1. The number 21 data verifier 31 receives the first track of data for copy number 1. The number 2T verifier 33 receives the T track of data for copy number 2, which is identical to the T track of data in copy number 1. The N1 data verifier 35 receives the first data track of copy number N which is identical to the first data track of copy number 1. The NT data verifier 37 receives the T track of data for copy number N. By this organizational scheme, each bit of data recorded on the copies may be 100 percent verified.

Figure 2:
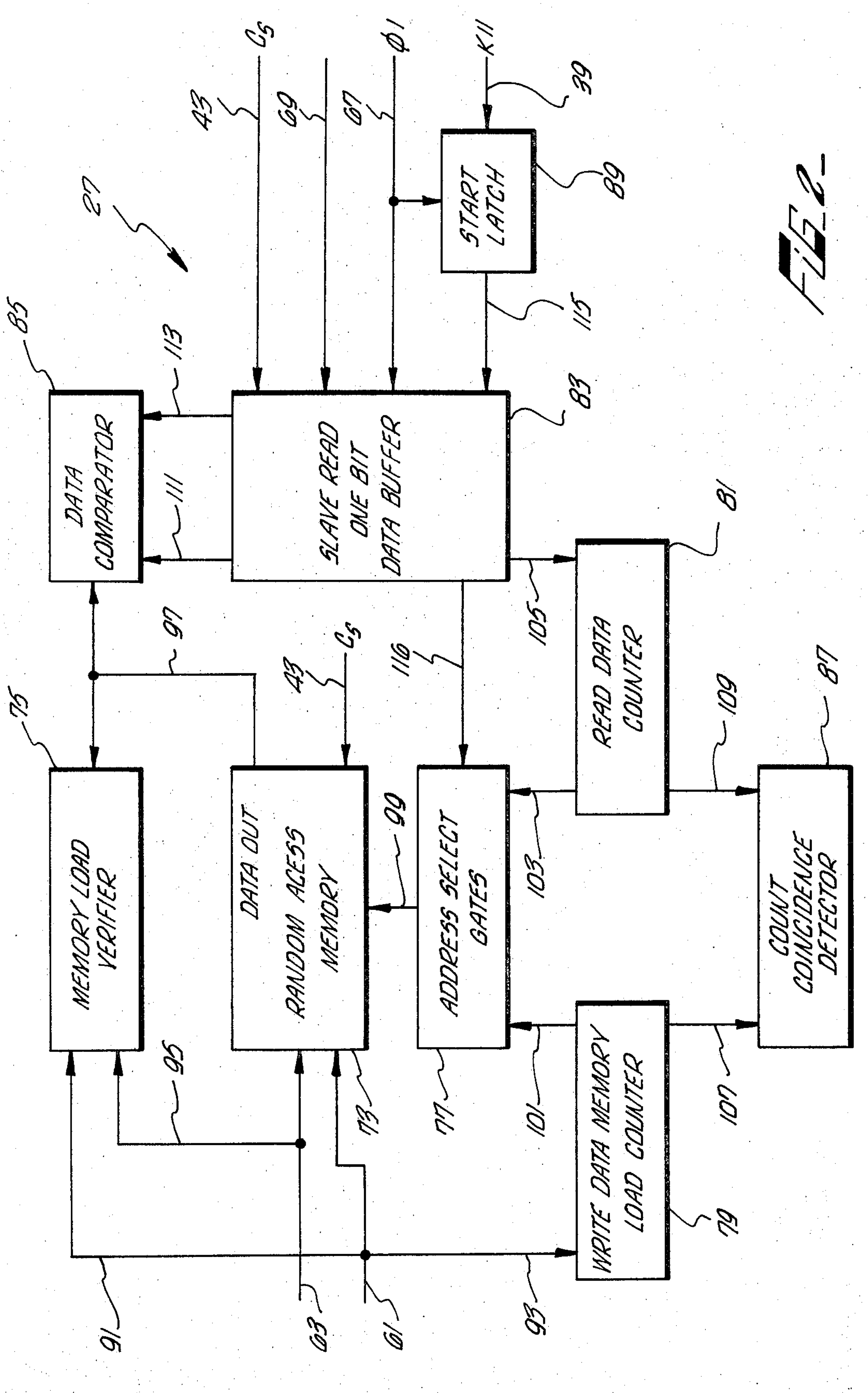
FIG. 2 is a block diagram representation of the data verification apparatus of this invention.

Referring now to FIG. 2, the structure of a data verifier, for example, number 11 data verifier 27 is shown. Data being written onto the copies 21 through 25 by the write electronics of multiple slave drive unit 15 (FIG. 1) is also supplied to a random access memory 73, one for each track of data, over lines 63 and 61; line 63 being the data line, line 61 being the clock line having phase one timing. The random access memory 73 is well known in the art and, therefore, its structure will not be discussed herein. The memory is driven by two other clock pulse trains, CS, fed to it over line 43 which are in a second and third phase relationship with the write clock pulse train received by the memory 73 over line 61.

Data is read out of the memory 73 over line 97 to a memory load verifier circuit 75 and a data comparator circuit 85. Lines 91 and 95 load the memory load verifier 75 with the write data from line 63 and the phase one clock information from line 61.

The memory load verifier 75 is basically an Exclusive OR logic circuit that compares the character of the two signals received on a bit-to-bit basis and gives an indication is there is no coincidence between them. The signals compared, of course, are binary data bits. In other words, either a binary 1 or a binary 0 representation. The function of the memory load verifier 75 is to insure that what is written into a certain memory location in the random access memory 73 is really there. This is accomplished in a manner that will be hereinafter explained in connection with the operation of the data verifiers of this invention.

Data comparator 85 which is also an Exclusive OR circuit, compares information on a bit-to-bit basis in the same manner as the memory load verifier 75. The data comparator 85, however, compares the data read from the track of data being reproduced on the copies by the multiple slave drive 15 with the data written on this track.

The data read from the copy is received by a one-bit data buffer 83 over lines 69 and 67, line 67 carrying the phase one clock information read from the copy. The one-bit data buffer 83 also receives phase three clock information over line 43 from the clock generating apparatus in the read/write data synchronizer 13 (FIG. 1). A start control signal $K_{11}$ is sent from the operator control circuit 19 (FIG. 1) over line 39 to a start latch 89 to initiate operation of the data compare function of the data verifier 27 by energizing its logic. The start latch 89 is energized only when there is a coincidence between the $K_{11}$ start signal received over line 39 and the occurrence of the first clock pulse on line 67. This will happen some period of time after the first clock pulse appears on line 61 and is written on the copy, the time span depending on the physical relationship between the read gap and the write gap on the head in the multiple slave drive (FIG. 1), normally 120 bits. This clock pulse is also supplied to the write data memory load counter 79 over line 93 wherein a count of the number of write clock pulses received is generated.

When the first read clock pulse is received by the one-bit data buffer 83 over line 67, a count is also started in a read data counter 81 which counts the number of clock bits read from the copy. The read data count of counter 81 is supplied to address select gates circuitry 77 over line 103, which acts as a pointer to a particular memory location for readout purposes. The count of the write data memory load counter 79 is supplied to the address select gates circuitry 77 over line 101 as a pointer to a particular memory location for write purposes. The outputs of the write data memory load counter 79 and the read data counter 81 are supplied over lines 107 and 109 respectively to a count coincidence detector 87 which generates an indication when the count of the write data memory load counter 79 is equal to the count in the read data counter 81. Coincidence in the counts is an indication that the number of clock bits recorded on a copy equals the number of clock bits read from that copy. If coincidence is not present, an error in recording has occurred somewhere along the track.

Figure 3:
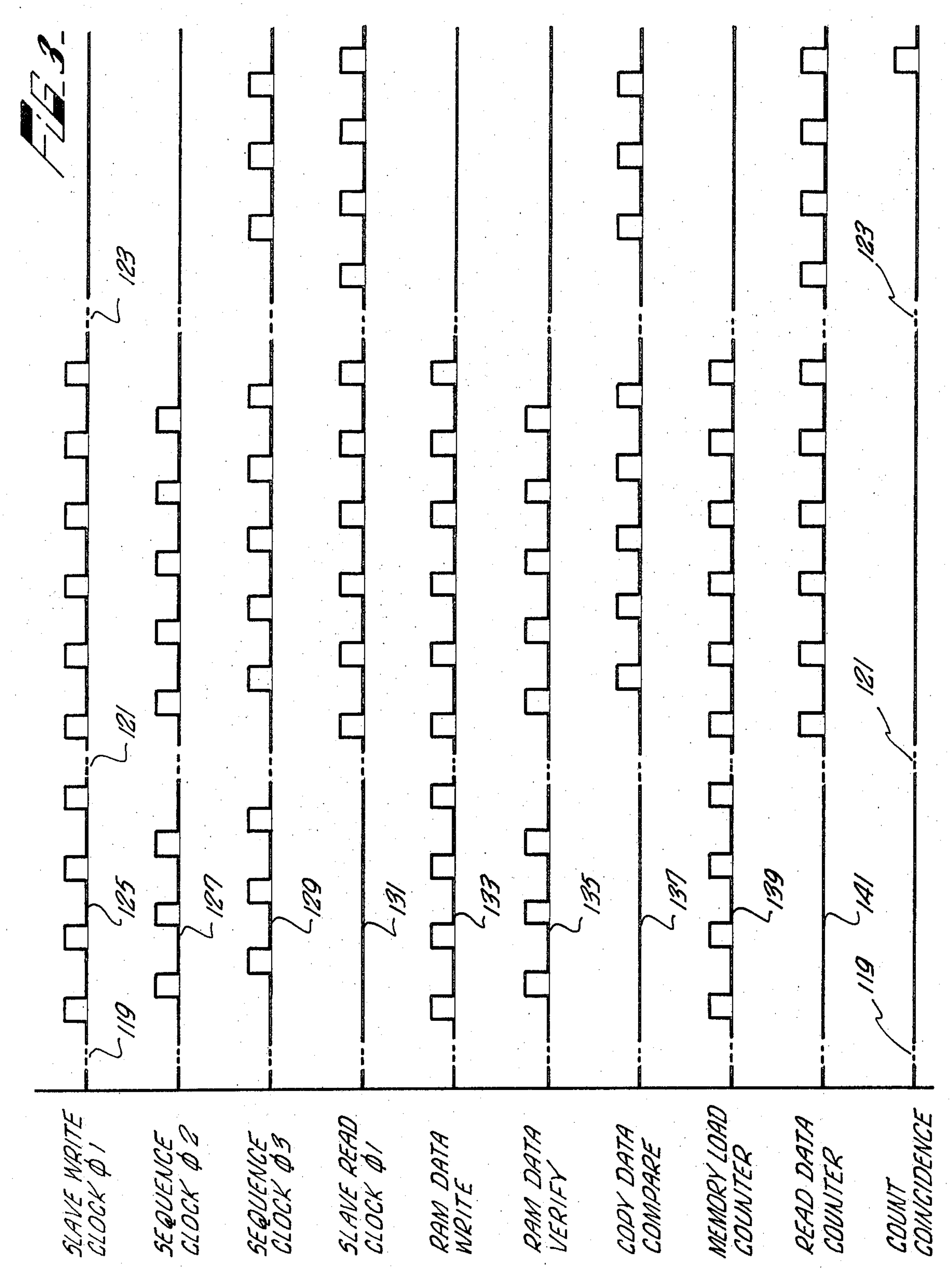
FIG. 3 is a pulse diagram representing a sequence of the functional relationships of the structure of FIG. 2.

Referring now to FIG. 3, the pulse diagrams illustrate the sequence of functional occurrences in the various circuits of FIG. 2. An explanation of the functional relationship of the apparatus of FIG. 2 will now be given with reference to both FIG. 2 and FIG. 3. As was explained earlier, the clock generating apparatus in the read/write data synchronizer 13 (FIG. 1) generates a three-phase clock signal. The clock information received on line 61 by random access memory 73 is for convenience labeled the $\phi$ 1 slave write clock 125. This clock information is also written on the copy being generated. The $\phi$ 2 sequence clock pulse 127 and the $\phi$ 3 sequence clock pulse 129, are supplied to the one-bit data buffer 83 and to the random access memory 73 over line 43 and to the address select gates circuit 77 over line 116.

As can be seen from FIG. 3, the $\phi$ 1 slave write clock signals 125 are first in time, the $\phi$ 2 sequence clock signals 127 are second, and the $\phi$ 3 sequence clock signals 129 are third in time, following each other closely. The slave read clock signals 131 are $\phi$ 1 clock signals since they are the clock signals read from the copy being generated.

The pulse indications of FIG. 3 should be understood to be idealistic representations of reality, only indicating the general operational relationship of the occurrences in the data verifier of1this invention, each phase one pulse in the diagram of FIG. 3 representing a one-bit data period. Indications 119, 121, and 123 of FIG. 3 are representative of breaks in the pulse strings with pulses occurring therein in the predetermined pattern.

As each bit of data is clocked into the random access memory 73 by $\phi$ 1 slave write clock pulses, on line 61, the write memory load counter 79 is advanced by one count causing the address select gates circuit 77 to indicate the next storage space in the random access memory 73 to be occupied by the next data bit. Before the next bit of data is written into the random access memory 73, a $\phi$ 2 sequence clock pulse is supplied to the random access memory 73 causing the bit just written to be read out. These two bits are compared in the memory load verifier 75, an error indication given, if coincidence is not detected.

Thus, as can be seen from FIG. 3, every time the slave write clock generates a $\phi$ 1 pulse, a bit of data is written into the random access memory 75, as shown by the data write line 33 of FIG. 3. Before the next bit of data is written, a $\phi$ 2 sequence clock pulse, causes the data in the random acccess memory 73 to be verified, as indicated by the data verify line 135 of FIG. 3. Until the read gap or read head of the slave drive (FIG. 1) picks up the first bit of written information from the copy medium, the $\phi$ 3 sequence clock pulses will not cause any operation to occur because the start latch 89 has not yet been activated.

Upon the first bit of data being read from the copy by the read gap on the head, (not shown) the first $\phi$ 1 slave read clock pulse 131 clocks it into the slave read one bit data buffer 83 over line 69. The first slave read clock pulse also triggers the latch 89. As this first bit of slave read data is read into the one bit data buffer 83, it is also supplied to the read data counter 81 to advance the count therein. The output of the read data counter 81 is supplied to the address select gates circuitry 77, which responds to the output of the read data counter 81 to point to the storage location in the random access memory 73 that has stored that first bit of information now being read from the copy. During this phase one clock time, another bit of data is being read into the random access memory over line 63 from the master into a location in the memory selected by address select gates circuitry 77, as directed by the write data memory load counter 79. This particular data bit is then verified during the phase two clock time by memory load verifier 75, as explained earlier.

Since a bit of information is stored in the data buffer 83, during this time period, the $\phi$ 3 sequence clock pulse 129 will cause the bit of information stored in the data buffer 83 to be clocked into the data comparator 85 at the same time that the first bit of information read into random access memory 73 is read out of the storage location selected by the address selecting circuitry 77, as indicated by the read data counter 81 and directed by the $\phi$ 3 clock train. These two bits of information, the one from the random access memory and the one from the data buffer, are compared in the data comparator 85 during the $\phi$ 3 sequence clock period, as indicated by the data compare pulse line 137 of FIG. 3. If a coincidence occurs, no indication is given. If there is a lack of coincidence between the two bits, an error signal which may trigger a stop cycle or merely present an error indication without interrupting the copying sequence, is generated.

The particular procedure, as thus far described, will continue in this manner, as illustrated by the pulse sequences of FIG. 3, until every bit of data on the master has been read from the slave and compared, bit by bit with the master copy. At the time when the last bit of data has been read from the copy, the count of the read data counter 81 must equal the count of the write data memory load counter 71, the write data memory load counter 79 having led the read data counter 81 in its count throughout the cycle. If there is a count coincidence between the two counters 79 and 81, count coincidence detector 87, as supplied over lines 107 and 109 by the respective counters, will indicate such a coincidence as illustrated by the count coincidence pulse train 143.

In summary, therefore, it should be understood that the data verifier of FIG. 2 is representative of the type of verifier used in the digital data copy duplication system of FIG. 1. It helps to provide a fast digital data record duplication system that can generate a plurality of master quality slave copies from one master record by providing a fast bit-to-bit data verification for each track of digital data duplicated on the slave copy.

It shoud be understood, of course, that the foregoing disclosure relates to only preferred embodiments of the invention, and that numerous modifications or alterations may be made therein without departing from the spirit and scope of the invention as set forth in the appended claims.

What is claimed is:

1. A tape duplication system for generating magnetic tape copies of information recorded in binary form on a master magnetic tape, comprising:

a master tape drive having a tape therein carrying information represented as binary bits;

a slave tape drive having a tape therein that is blank;

means for writing binary information bits previously read from the tape in said master tape drive onto the tape in said slave tape drive as other binary information bits are read from the tape in said master tape drive;

means for storing less than all the binary information bits as they are written on the tape in said slave tape drive;

means for reading binary information bits from the tape in said slave tape drive as other binary information bits are being written on the tape in said slave tape drive;

means for temporarily storing one bit of the binary information on said slave tape drive as it is read from the tape in said slave tape drive;

means for removing the binary information bit that corresponds with the bit presently in said temporary store means from said storing means; and means for comparing the bit removed from said storing means with the bit in said temporary storing means.

2. The tape duplication system of claim 1 wherein said storing means has a plurality of bit storage locations, and further comprises means for comparing each bit of data stored in a particular storage location in said storing means with the bit of data removed from the same storage location, before another bit of data is stored in another storage location in said storing means, in between comparing the bits removed from said storing means with the bits read from the tape in said slave tape drive.

3. The tape duplication system of claim 1, further comprising:

first means for counting the number of clock bits being utilized to store the binary information bits in said storing means;

second means for counting the number of clock bits being utilized to read the binary information bits from the tape in said slave tape drive; and means for detecting a coincidence in the count of said first counting means and said second counting means.

4. A verification process for a tape duplication system that generates magnetic tape copies of information recorded in binary form on a master magnetic tape wherein clock and data information previously read from the master tape is written on a copy tape as other clock and data information is read from the master tape, said verification process comprising:

storing the bits of the data information as the bits are being written on the copy tape;

selectively removing a specific stored bit in between the storing of the bits of data information;

reading the bits previously written on the copy tape; and comparing the specific bit removed with the same bit read from the copy tape, in between the storing of bits in said storing means.

5. The verification process of claim 4, further comprising:

recovering each bit of data stored immediately after it is stored; and comparing the read bit with the stored bit in between the comparing of the bits removed from said storing means with the bits read from the copy tape.

6. The verification process of claim 4, further comprising:

counting the number of clock bits being utilized to store the data information bits;

counting the number of clock bits being utilized to read the data information bits from the copy tape; and detecting a coincidence in the count generated by the first and second counting steps.

* * * * *